(12) United States Patent
Lee et al.

(10) Patent No.: US 7,565,599 B2
(45) Date of Patent: Jul. 21, 2009

(54) INFORMATION STORAGE MEDIUM ON WHICH DRIVE DATA IS RECORDED, AND METHOD OF RECORDING INFORMATION ON THE INFORMATION STORAGE MEDIUM

(75) Inventors: Kyung-geun Lee, Gyeonggi-do (KR); In-sik Park, Gyeonggi-do (KR); Jung-wan Ko, Gyeonggi-do (KR); Du-seop Yoon, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 108 days.

(21) Appl. No.: 11/585,950

(22) Filed: Oct. 25, 2006

(65) Prior Publication Data

US 2007/0058495 A1 Mar. 15, 2007

Related U.S. Application Data

(63) Continuation of application No. 10/461,329, filed on Jun. 16, 2003, now Pat. No. 7,203,891.

(30) Foreign Application Priority Data

Jul. 15, 2002 (KR) ............................... 2002-41292

(51) Int. Cl.
*G11C 29/00* (2006.01)
(52) U.S. Cl. .................................... 714/769
(58) Field of Classification Search ............... 714/769
See application file for complete search history.

(56) References Cited

U.S. PATENT DOCUMENTS 5,111,444 A 5/1992 Fukushima et al.

(Continued)

FOREIGN PATENT DOCUMENTS

CN 1346488 4/2002

(Continued)

OTHER PUBLICATIONS

First Office Action issued Jan. 6, 2006 re: Chinese Application No. 038167182 by the State of Intellectual Property Office of the People's Republic of China.

(Continued)

*Primary Examiner*—Guy J Lamarre
*Assistant Examiner*—Sam Rizk
(74) *Attorney, Agent, or Firm*—Stein McEwen, LLP

(57) ABSTRACT

An information storage medium includes a drive zone having a plurality of physical clusters or ECC blocks. When new drive data is recorded in the drive zone, the new drive data is recorded in a physical cluster or ECC block next to the physical cluster or ECC block containing the most recently recorded drive data. In the method of recording drive data, the drive data is recorded in a physical cluster or ECC block of the drive zone. When the drive zone is updated with the new drive data, the new drive data is recorded in the physical cluster or ECC block adjacent to physical cluster or ECC block containing the most recently drive data. The drive data recording method is applicable to a new format of information storage medium.

11 Claims, 7 Drawing Sheets

U.S. PATENT DOCUMENTS

| | | |
|---|---|---|
| 6,243,796 B1 | 6/2001 | Otsuka |
| 6,552,982 B1 | 4/2003 | Fukushima et al. ...... 369/47.52 |
| 6,678,236 B1 | 1/2004 | Ueki ........................ 369/275.3 |
| 6,782,487 B2 | 8/2004 | Gotoh et al. |
| 6,940,795 B2 | 9/2005 | Fukushima et al. ...... 369/47.52 |
| 7,039,913 B1 * | 5/2006 | Sensyu ........................ 718/100 |
| 7,095,694 B2 | 8/2006 | Sako et al. |
| 7,203,891 B2 | 4/2007 | Lee et al. |
| 2001/0036136 A1 | 11/2001 | Fukushima et al. |
| 2002/0114233 A1 | 8/2002 | Sasaki et al. |
| 2003/0035239 A1 | 2/2003 | Ottesen et al. |
| 2003/0117922 A1 | 6/2003 | Park ........................ 369/53.24 |
| 2003/0174605 A1 | 9/2003 | Sako et al. |
| 2003/0174612 A1 | 9/2003 | Fukushima et al. ...... 369/47.52 |
| 2003/0223328 A1 | 12/2003 | Nadershashi et al. ..... 369/47.14 |
| 2006/0104193 A1 | 5/2006 | Sasaki et al. |
| 2007/0058495 A1 | 3/2007 | Lee et al. |
| 2007/0058496 A1 | 3/2007 | Lee et al. |

FOREIGN PATENT DOCUMENTS

| | | |
|---|---|---|
| JP | 2000-322818 | 11/2000 |

OTHER PUBLICATIONS

U.S. Appl. No. 10/461,329, filed Jun. 16, 2003, Kyung-geun Lee et al., Samsung Electronics Co., Ltd.

U.S. Appl. No. 11/487,394, filed Jul. 17, 2006, Kyung-geun Lee et al., Samsung Electronics Co., Ltd.

U.S. Appl. No. 11/967,722, filed Dec. 31, 2007, Kyung-geun Lee et al., Samsung Electronics Co., Ltd.

U.S. Appl. No. 11/585,952, filed Oct. 25, 2006, Kyung-geun Lee et al., Samsung Electronics Co., Ltd.

International Search Report issued on Oct. 30, 2003, in International Application No. PCT/KR03/01333 (2 pages, in English).

* cited by examiner

FIG. 2B

| POSITIONS OF BYTES IN DATA | CONTENTS |
|---|---|
| . . . | . . . |
| m | PHYSICAL ADDRESS OF AREA WHERE LAST DRIVE DATA HAS BEEN RECORDED |
| m+1 | . . . |
| . . . | . . . |

FIG. 3B

| POSITIONS OF BYTES IN DATA | CONTENTS |
|---|---|
| ... | ... |
| m | PHYSICAL ADDRESS OF AREA WHERE LAST VALID DRIVE DATA HAS BEEN RECORDED |
| m+1 | PHYSICAL ADDRESS OF AREA WHERE LAST COPY DRIVE DATA HAS BEEN RECORDED |
| ... | ... |

INFORMATION STORAGE MEDIUM ON WHICH DRIVE DATA IS RECORDED, AND METHOD OF RECORDING INFORMATION ON THE INFORMATION STORAGE MEDIUM

CROSS-REFERENCE TO RELATED APPLICATION

This application is a continuation of application No. 10/461,329 filed on Jun. 16, 2003, now U.S. Pat. No. 7,203,891, which claims the benefit of Korean Patent Application No. 2002-41292 filed on Jul. 15, 2002, in the Korean Intellectual Property Office, the disclosures of which are incorporated herein by reference in their entirety.

BACKGROUND OF THE INVENTION

1. Field of the Invention

The present invention relates to an information storage medium on which drive data is recorded, and a method of recording data on the information storage medium.

2. Description of the Related Art

Recordable optical disks (e.g., 4.7 GB DVD-RAM) are designed so that, after one disk is inserted into a drive, information is recorded about the drive used. For example, the information can be about the manufacturer of the drive or the serial number of the drive. The recorded drive data is recorded in a disk identification zone, which is a recordable data zone in a lead-in area of the disk. Similarly, in recordable high definition digital versatile disks (HD-DVDs) having a recording capacity of 20 GB or greater, the lead-in area needs to include a drive zone having a plurality of physical clusters in order to record the drive data.

Accordingly, an optimal method of recording drive data on a new format of an information storage medium needs to be proposed.

SUMMARY OF THE INVENTION

The present invention provides a method of adaptively recording drive data on an information storage medium with a new structure, and more particularly, an information storage medium in which drive-related data is recorded in a drive zone having a plurality of physical clusters or ECC blocks, and new drive data is recorded in a physical cluster or ECC block directly next to the recently-recorded physical cluster or ECC block, and a method of recording data in the information storage medium.

Additional aspects and/or advantages of the invention will be set forth in part in the description which follows and, in part, will be obvious from the description, or may be learned by practice of the invention.

According to an aspect of the present invention, an information storage medium includes a drive zone for recording disk drive data to be recorded in a plurality of physical clusters or ECC blocks, wherein newer drive data is recorded in a second physical cluster or ECC block adjacent a first physical cluster or ECC block containing a most recently recorded drive data recorded prior to the recording of the newer drive data.

According to an aspect of the invention, every time new drive data is to be recorded, previous drive data is also recorded in the second physical cluster or ECC block.

According to another aspect of the invention, identical drive data is recorded in a set of physical clusters or ECC blocks that are sequentially grouped in order of a layout of the physical clusters.

According to a further aspect of the invention, valid drive data and copy drive data are recorded in two sequential reliable, effective physical clusters or ECC blocks, respectively.

According to an additional aspect of the invention, the addresses of the physical clusters or ECC blocks are recorded in an area for recording information related to defect management, in an area for recording recording-related information, or in an area for recording disk-related information.

According to another aspect of the present invention, a method of recording drive data on an information storage medium includes recording first drive data in one of a plurality of physical clusters or ECC blocks which comprise a drive zone, and next recording new drive data in another physical cluster or ECC block directly adjacent to the one physical cluster or ECC block containing the most recently recorded drive data.

BRIEF DESCRIPTION OF THE DRAWINGS

The above and/or other features and advantages of the present invention will become more apparent by describing in detail exemplary embodiments thereof with reference to the accompanying drawings in which:

FIG. 2B is a table showing a method of recording the address of a drive zone on the information storage medium of FIG. 2A;

FIG. 3B is a table showing a method of recording the address of a drive zone on the information storage medium of FIG. 3A;

DETAILED DESCRIPTION OF THE EMBODIMENTS

Figure 1:
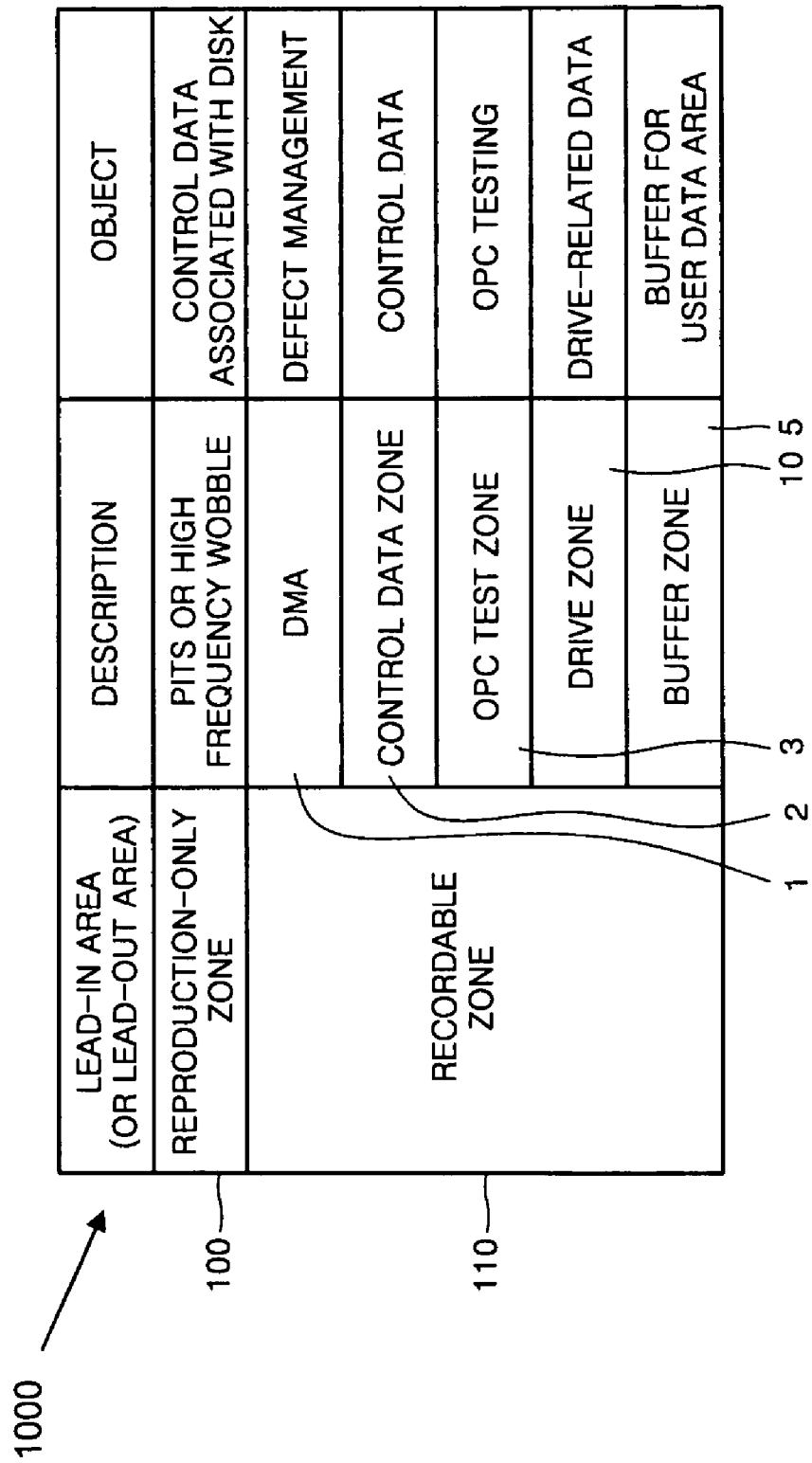
FIG. 1 shows the data structure of a lead-in area or a lead-out area of a disk related to the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an example of the physical structure of a lead-in area which covers an area within a predetermined radius from the central hole of a disk 1000. The lead-in area includes a reproduction-only zone 100, in which data is pre-recorded, and a recordable zone 110. The reproduction-only zone 100 stores control data associated with the disk 1000. The recordable zone 110 includes a defect management area (DMA) 1 for processing and managing defects generated in a disk, a control data zone 2, an optimum power control (OPC) test zone 3, and a buffer zone 5.

The recordable zone 110 further includes a drive zone 10 in which drive data is recorded according to an aspect of the invention. The drive zone 10 includes a plurality of physical clusters or ECC blocks 10-0 through 10-$n$ shown in FIG. 2A. Each of the physical clusters or ECC blocks 10-0 through 10-$n$ includes a plurality of sectors or data frames. The drive zone 10 having this structure stores drive data, such as information about the manufacturer of a used drive, the serial number of the drive, and the like.

In an information storage medium 1000 according to the present invention, new drive data is recorded in a physical cluster or ECC block directly next to a physical cluster or ECC block in which previous data has been recorded. The drive zone 10 can also be located in an area other than a user data area of the disc 1000. For example, the drive zone 10 can be provided in a lead-in area or a lead-out area of the disc 1000.

As shown in FIG. 1, the lead-in area (or lead-out area) of the information storage medium 1000 includes the reproduction-only zone 100 and the recordable zone 110. The reproduction-only zone 100 stores basic information about a disk in the form of pits or a high frequency groove wobble. The reproduction-only zone 100 stores the size, version number, and recording conditions of the disk. The recordable zone 110 includes the DMA 1, the control data zone 2, the OPO test zone 3, the drive zone 10, and the buffer zone 5. The drive zone 10 stores drive-related information in the recordable zone 110.

Figure 2A:
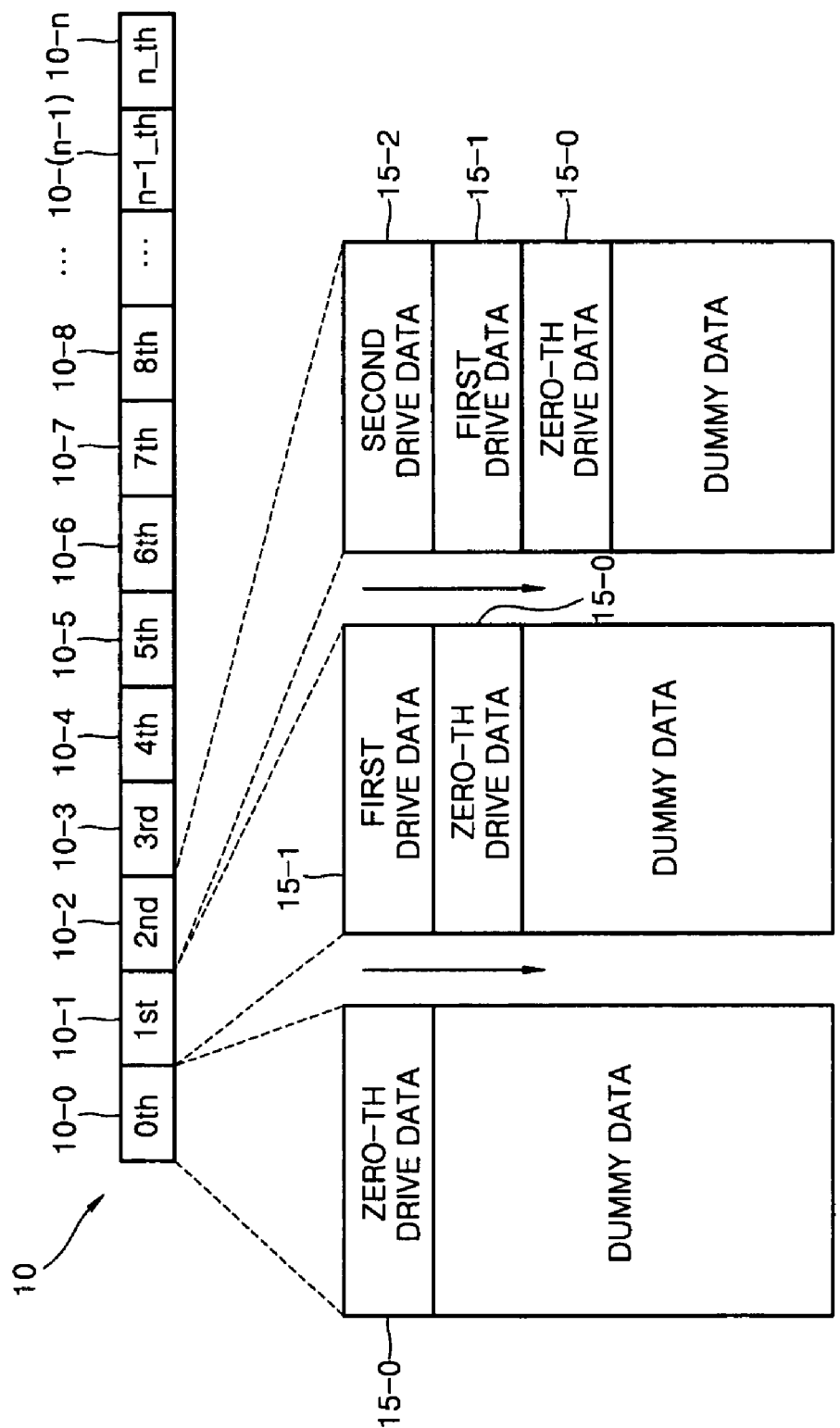
FIG. 2A shows an information storage medium according to an embodiment of the present invention.

Referring to FIG. 2A, a drive zone 10 in an information storage medium 1000 according to an embodiment of the present invention includes (n+1) physical clusters or ECC blocks comprising a zero-th physical cluster or ECC block 10-0 through an n-th physical cluster or ECC block 10-n. Each physical cluster or each ECC block 10-0 through 10-n includes a plurality of sectors or frames according to aspects of the invention. For convenience, reference will be made only to physical clusters.

Zero-th drive data 15-0, which is first used, is recorded in the zero-th physical cluster 10-0. After the recording of the zero-th drive data, any remaining unrecorded area is filled with dummy data. Next, if data is recorded or reproduced by a new drive (i.e., a first drive), first drive data 15-1 about the new drive is recorded in a first physical cluster 10-1 following the zero-th physical cluster 10-0. The first drive data 15-1 is recorded in the first physical cluster 10-1. The zero-th drive data 15-0 which is recorded in the zero-th physical cluster 10-0 is copied and is also recorded in the first physical cluster 10-1.

Similarly, if another new drive, which is a second drive, is used to execute recording, second drive data 15-2, which is data about the second drive, is recorded in a second physical cluster 10-2 following the first physical cluster 10-1 where the last data 15-1 has been recorded. The most recently recorded drive data, the second drive data 15-2, is recorded at the head of the second physical cluster 10-2. The first and zeroth drive data 15-1 and 15-0, which have already been recorded, are copied and sequentially recorded next to the second drive data 15-2.

As described above, every time new drive data is recorded, previously-recorded drive data is recorded again so that the history of the previous drive data is known. Recent drive data is recorded at the head of a physical cluster, and the previously-recorded drive data is copied and recorded next to the recent drive data. Accordingly, reproduction of all physical clusters containing previously-recorded drive data is not required since all of the drive data can be recognized by reproducing only the physical cluster containing the most recent recorded drive data. Thus, the drives used can be efficiently managed. However, it is understood that other arrangements of drive data can be made in order to manage the drives without departing from the spirit of the invention.

According to an aspect of the invention, an address of a physical cluster 10-0 through 10-n, which contains the most recently recorded drive data, is recorded in an area separate from the drive zone 10. As shown in FIG. 2B, the address of a physical cluster or ECC block 10-0 through 10-n, which contains the most recently recorded drive data, can be recorded in a predetermined area of the disc 1000. More specifically, the address of an area containing the most recently recorded drive data can be recorded in the DMA 1, which includes data about defect management, in an area containing recording-related data (e.g., a recording speed, a recording pulse, recording power, etc.), or in an area containing disk-related data (e.g., the type, version number, size, and number of layers of a disk). The area containing recording-related data or disk-related data may be the control data zone 2 of FIG. 1.

As shown in FIG. 2B, the address of a physical cluster or ECC block 10-0 through 10-n, which contains the most recently recorded drive data is recorded at a predetermined byte of a data frame included in the area containing recording-related data or disk-related data. Every time new drive data is recorded in a predetermined area, the physical address of the area containing the new drive data may be recorded at a byte different from the byte where the physical address of the area containing the previous drive data has been recorded, or may be overwritten at the byte where the physical address of the area containing the previous drive data has been recorded.

Figure 3A:
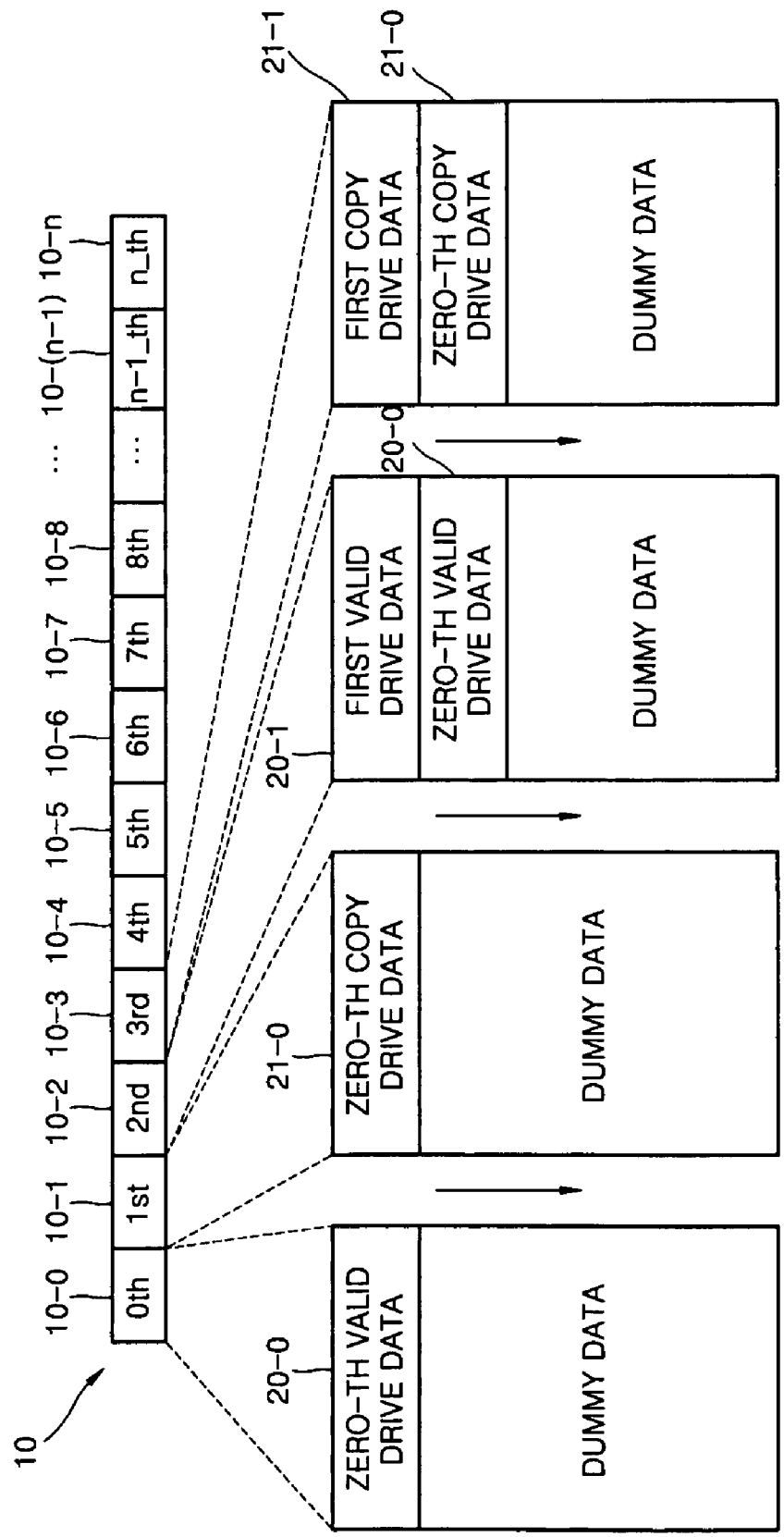
FIG. 3A shows an information storage medium according to another embodiment of the present invention and a method of recording data on the information storage medium.

An information storage medium according to another embodiment of the present invention and a method of recording data thereon will now be described with reference to FIGS. 3A and 3B. In the data recording method, if a drive zone 10, where drive data is recorded, has unreliable physical clusters 10-0 through 10-n due to continuous or discontinuous generation of defects in the physical clusters or ECC blocks 10-0 through 10-n, the drive data is recorded in only the reliable, effective ones of the physical clusters 10-0 through 10-n in order of the layout of physical clusters 10-0 through 10-n. The drive data can be recorded in such a way that one drive datum is recorded on one physical cluster or ECC block in sequence 10-0 through 10-n. Alternatively, to increase reliability, the same drive data can be recorded in a set of consecutive physical clusters or ECC blocks 10-0 through 10-n.

In case the drive data is damaged and cannot be used, identical data is recorded in at least two physical clusters or ECC blocks 10-0 through 10-n. Referring to FIG. 3A, for example, two physical clusters or ECC blocks 10-0 through 10-n are used to record the same drive data. Hereinafter, for the sake of simplicity, reference will be made only to physical clusters.

For example, zeroth valid drive data 20-0 is recorded in the zeroth physical cluster 10-0 of an area for recording drive data. A zeroth copy drive data 21-0, which is a copy of the zeroth valid drive data 20-0, is recorded in the first physical cluster 10-1. If new first valid drive data 20-1 is recorded, the new first valid drive data 20-1 is recorded in the second physical cluster 10-2 following the first physical cluster 10-1, which contains the most recently recorded copy drive data 21-0 (i.e., the zeroth copy drive data 21-0). The previously-recorded drive data (i.e., the zeroth valid drive data 20-0) is then recorded in the second physical cluster 10-2. First copy drive data 21-1, which is a copy of the first valid drive data 20-1, is recorded in the third physical cluster 10-3. As described above, every time drive data is updated, valid drive data and copy drive data can be recorded in the aforementioned way.

The addresses of physical clusters, where valid drive data and copy drive data are recorded using a drive data recording method according to an embodiment of the present invention, are recorded and managed in a predetermined area separate from the drive zone 10. For example, the address of the area containing the last valid drive data and the address of the area containing the last copy drive data can be recorded at a predetermined byte in a data frame of the DMA 1, in a data frame of the area containing recording-related data, or in a data frame of the area containing disk-related data. Each of the areas containing recording-related data and disk-related data may be the control data zone 2 of FIG. 1.

The above description sets forth a case where all of the physical clusters or ECC blocks 10-0 through 10-n of a drive zone 10 are effective. However, a case may exist where ones of the physical clusters or ECC blocks 10-0 through 10-n are consecutively or discontinuously damaged or have defects. Accordingly, drive data recorded therein is not reliable. In this case, the drive data needs to be recorded in only reliable, effective ones of the physical clusters or ECC blocks 10-0 through 10-n.

Figure 4:
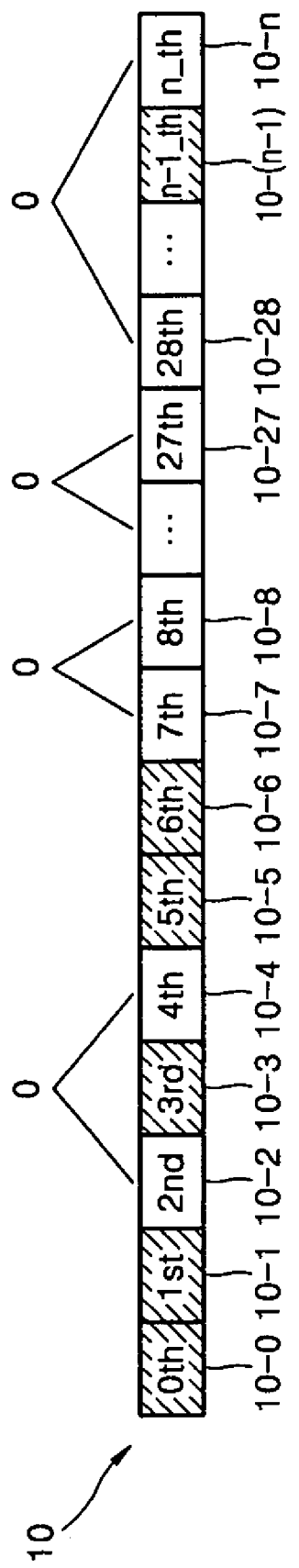
FIG. 4 shows a defective drive zone in the information storage medium of FIG. 3A.

FIG. 4 schematically shows a drive zone comprised of n+1 physical clusters, in which some damaged unreliable physical clusters 10-0, 10-1, 10-3, 10-5, 10-6, and 10-(n−1) are indicated using hashing. Referring to FIG. 4, the zeroth and first physical clusters 10-0 and 10-1 are damaged, the second physical cluster 10-2 is effective, the third physical cluster 10-3 is damaged, and the fourth physical cluster 10-4 is effective. In this case, valid drive data and corresponding copy drive data are recorded in the second and fourth reliable, effective physical clusters 10-2 and 10-4, respectively. Also, copy drive data and valid drive data are recorded in effective seventh and eighth physical clusters 10-7 and 10-8, respectively. It is understood that the above method is useable if no copy drive data is used, such as in the embodiment set forth above with reference to FIG. 2A.

As described above, drive data is recorded in only reliable physical clusters, which are not damaged, in order of the physical cluster layout of a drive zone 10. Preferably, the same drive data is recorded in two sequential, reliable physical clusters. As shown in FIG. 4, if the zeroth and first physical clusters 10-0 and 10-1 are damaged and unusable, the second physical cluster 10-2 is reliable, and the third physical cluster 10-3 is also unusable, drive data is recorded in reliable physical clusters in order of the layout of the physical clusters. Here, the drive data corresponds to a pair of valid drive data and copy drive data. In FIG. 4, "0" denotes recording of drive data in two sequential reliable, effective physical clusters.

As also noted above, the recording method is equally applicable to a drive zone 10 which includes ECC blocks instead of physical clusters.

The present invention provides a new drive data recording method which is applicable to a new format of an information storage medium. The new drive data recording method can be effectively applied not only to recordable information storage media, but also to write-once information storage media. In write-once information storage media, each physical cluster or ECC block records data once. Accordingly, when new drive data is recorded in a write-once information storage medium, it cannot be recorded in a previously-recorded physical cluster or ECC block but only in a physical cluster or ECC block directly next to the physical cluster or ECC block where the last drive data has been recorded. Therefore, the recording method according to the present invention is suitable for write once recording media. As such, the method could be applied to CD-R, DVD-R, and next generation high definition DVDs, such as Blu-ray discs and Advanced Optical Discs (AODs).

In recordable information storage media, new drive data is recorded in an area where the last drive data has been recorded. Hence, even if only the area containing the last drive data is reproduced, drive data can be effectively managed.

Figure 5:
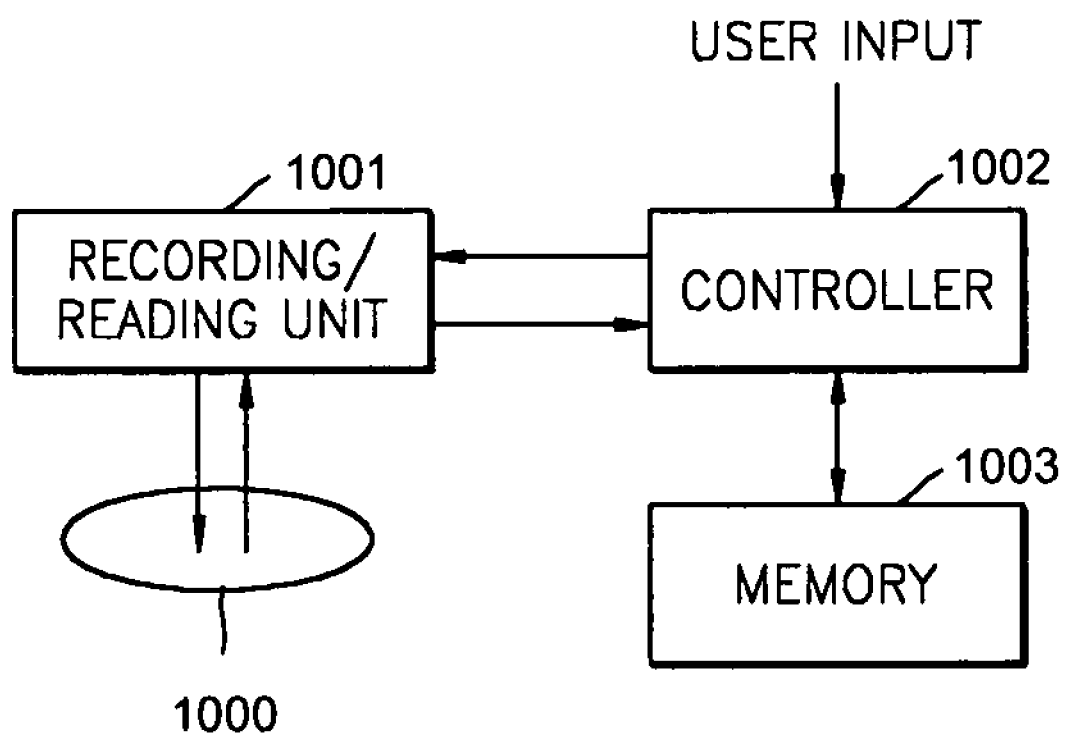
FIG. 5 is a block diagram of a recording apparatus according to an embodiment of the present invention.

FIG. 5 is a block diagram of a recording apparatus according to an embodiment of the present invention. Referring to FIG. 5, the recording apparatus includes a recording/reading unit 1001, a controller 1002, and a memory 1003. The recording/reading unit 1001 records data on a disc 1000, which is an embodiment of an information storage medium 1000 of the present invention, and reads the data from the disc 1000. The controller 1002 records and manages drive data according to the present invention as set forth above in relation to FIGS. 1 through 4.

While not required in all aspects, it is understood that the controller 1002 can be a computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording/reading unit 1001 could include a low wavelength, high numerical aperture type unit usable to record dozens of gigabytes of data on the disc 1000. Examples of such units include, but are not limited to, those units using light wavelengths of 405 nm and having numerical apertures of 0.85, those units compatible with Blu-ray discs, and/or those units compatible with Advanced Optical Discs (AOD). Examples of other write once discs include CD-R and DVD-R.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for recording/reproducing data on/from an information storage medium, the method comprising:
    recording first plurality of drive data in a first physical cluster; and
    recording second plurality of drive data in a second physical cluster
    recording location information of the second physical cluster on the information storage medium,
    wherein the second plurality of drive data comprises a portion of the first plurality of drive data and most recent drive data comparing to the first plurality of drive data.

2. The method as claimed in claim 1, wherein:
    the first plurality of drive data recorded in the first physical cluster indicates previously recorded drive data and contains information relating to a first drive system used to record and/or reproduce data on/from the information storage medium;
    the second plurality of drive data recorded in the second physical cluster contains information relating to a second drive system used to record and/or reproduce data on/from the information storage medium; and
    the first and second physical clusters represent two sequential reliable, effective physical clusters that are grouped in a drive zone included in an area on the information storage medium other than a user data area in which user data is recorded thereon.

3. The method as claimed in claim 2, wherein, when the second plurality of drive data is recorded in the second physical cluster, copying the first plurality of drive data indicating previously record drive data and recording copied drive data adjacent to the second plurality of drive data in the second physical cluster.

4. The method as claimed in claim 2, further comprising:
recording an address of the first or second physical cluster in an area on the information storage medium where information related to defect management is recorded.

5. The method as claimed in claim 4, wherein the address of the first or second physical cluster is recorded in a control data zone on the information storage medium recording-related information and disk-related information are recorded.

6. The method as claimed in claim 4, wherein the address of the first or second physical cluster is recorded in a defect management area (DMA) on the information storage medium where information about defect management is recorded.

7. The method as claimed in claim 4, wherein the drive zone is included in a recordable zone of a lead-in area on the information storage medium.

8. The method as claimed in claim 2, further comprising:
recording an address of the first or second physical cluster in an area on the information storage medium where recording-related information or disk-related information is recorded.

9. The method as claimed in claim 2, further comprising:
recording additional drive data identical to the first or second plurality of drive data in a set of physical clusters that are sequentially grouped in order of a layout of the physical clusters in the drive zone, wherein the set includes the corresponding one of the first and second physical clusters.

10. The method as claimed in claim 9, wherein:
the first or second plurality of drive data is valid,
the recording the first or second plurality of drive data and the additional drive data comprises recording the first or second copy drive data in two sequential reliable, effective physical clusters in the drive zone, respectively, and
the two sequential reliable, effective physical clusters include a corresponding one of the first and second physical clusters in the drive zone.

11. An information storage medium comprising:
a first physical cluster having first plurality of drive data; and
a second physical cluster having second plurality of drive data,
wherein location information of the second physical cluster is recorded on the information storage medium and the second plurality of drive data comprises a portion of the first plurality of drive data and most recent drive data comparing to the first plurality of drive data.

* * * * *